June 17, 1947.  W. H. CHURCHILL  2,422,289
ROTARY OPERATIVE FASTENER STUD
Filed Sept. 2, 1943

Inventor
Wilmer H. Churchill.
By Walter J. Jones
Attorney

Patented June 17, 1947

2,422,289

UNITED STATES PATENT OFFICE 2,422,289

ROTARY OPERATIVE FASTENER STUD

Wilmer H. Churchill, Saugus, Mass., assignor to United-Carr Fastener Corporation, Cambridge, Mass., a corporation of Massachusetts Application September 2, 1943, Serial No. 501,007

5 Claims. (Cl. 24—221)

The present invention relates to rotary operative fastener stud members and aims generally to improve existing stud members of that type.

Rotary operative fasteners, such as are used for detachably connecting together cowling and like sheets of aircraft, usually comprise a stud member rotatably mounted in one of the sheets and adapted to extend through an aperture of the other sheet and lockingly engage a socket or female fastener member to an opposite face of the second named sheet.

One form of rotary stud member commonly employed in such rotary operative fasteners comprises a substantially cylindrical shank having a rounded entering nose at one end and an enlarged head at the other end, said shank being provided with a crosspin of greater length than the shank diameter so as to provide radial arms or extensions for the stud. Such a rotary stud is illustrated in the Johnson Patent No. 2,305,572, dated December 15, 1942, and the Bedford, Jr., Patent No. 2,306,928, dated December 29, 1942.

Rotary studs of the type above referred to are made from solid bars or rod stock, usually on a screw machine, to form the cylindrical shank and enlarged head. In some instances, for example for smaller sizes, the shank and head may be made on a heading machine. The shank must then be drilled transversely and a pre-formed pin fitted therein with a pressed fit. The pin must be made to exact size and usually has its central portion milled or otherwise roughened so as not to be accidentally displaced from the shank while the fastener is in use. As the efficiency of the rotary operative fasteners, particularly cowling fasteners, depends upon the size and length of the stud, it is apparent that very close tolerances must be observed during manufacture. This requires added time and limits the production capacity of any plant manufacturing the fastener assemblies. Furthermore, the number of separate operations that must be observed in making the solid form of rotary stud above referred to makes the manufacture of this part relatively expensive.

The present invention aims to overcome the above stated and other objections by the provision of a hollow sheet metal stud that may be manufactured more expeditiously and inexpensively than prior solid studs of similar shape and configuration.

The above and other objects of the invention will be apparent to those skilled in the art from a consideration of the accompanying drawings and annexed specification illustrating and describing two embodiments of the invention.

Figure 6:
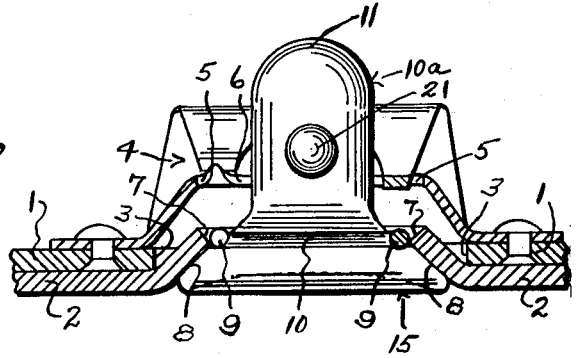
Fig. 6 is a sectional view illustrating one type of rotary operative fastener installation with which my improved stud may be used and Fig. 7 is a side elevation of the modified stud shown in Fig. 5.

Referring to Fig. 6, the rotary operative fastener may be conveniently used to detachably connect members 1 and 2, which members may be cowling sheets of aircraft or the like, though it will be understood that the invention is susceptible of use in other installations as well. In the illustrated type of fastener the inner sheet 1, which may be the supporting part, is apertured as at 3 over which is positioned a socket or female fastener member 4 attached to the inner or rear face of the supporting sheet 1. The socket member 4 may be of any approved type having a locking surface 5 formed with an opening 6 having radial elongations to permit passage of the nose and radial arms of the stud. The particular form of socket member, with the stud-receiving opening 6, selected for illustration herein is of the type shown in the Bedford patent referred to above. However, it is to be understood that other forms of socket member may be used so long as it has a locking surface to receive and lockingly engage the radial arms of the stud upon partial rotation thereof.

The sheet 2 which conveniently may be the part to be supported is also formed with an aperture 7 and an inwardly dished portion 8 adapted to receive the head of a stud member rotatively retained in the sheet 2 by suitable means, as for example a spring wire ring 9 seated in a semi-circular groove 10 in the stud, this being but one simple manner of rotatably mounting the stud in the sheet 2.

Figure 1:
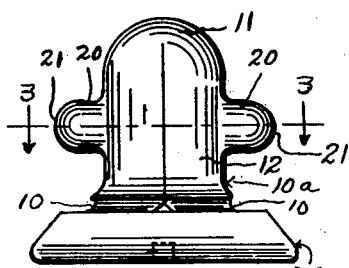
Fig. 1 is a side elevation of my improved stud member.
Figure 2:
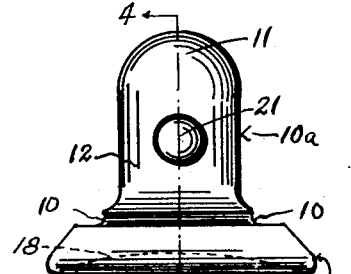
Fig. 2 is a similar view thereof as viewed from a position at right angles to Fig. 1.
Figure 3:
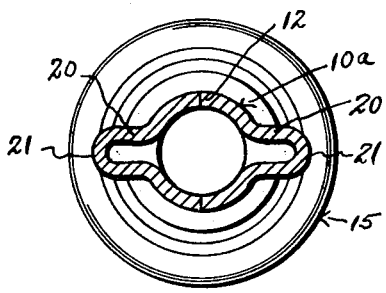
Fig. 3 is a horizontal sectional view taken on the line 3—3 of Fig. 1.
Figure 4:
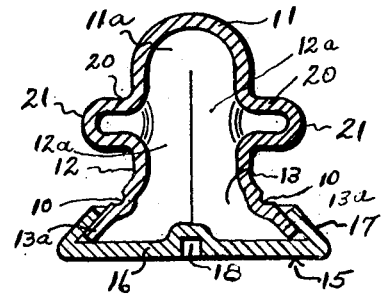
Fig. 4 is a vertical central sectional view of the stud member taken on the line 4—4 of Fig. 2.

The improved stud member 10ª of the present invention, according to the preferred embodiment as shown in Figs. 1 to 4 inclusive, is preferably of hollow construction and is formed of sheet metal shaped to provide a rounded nose 11, a substantially cylindrical shank portion 12 and an enlarged head 13. Preferably the nose, shank and head are formed from a single piece of sheet metal strip which is centrally dished to provide a substantially continuous semi-spherical portion 11a defining a nose 11 adjoining semi-cylindrical portions 12a—12a, the terminal ends of which are enlarged to provide head portions 13a—13a, as best shown in Figs. 1 and 4. The head portions 13a—13a may be substantially frustum in shape to provide a conical or flaring head when a flush type head is desired. In shaping the nose 11 to substantially semi-spherical form as shown, the semi-cylindrical shank portions 12a—12a and the head portions 13a—13a are brought into co-mating opposed relationship by folding the strip after forming, as shown in Figs. 1, 3 and 4, thus providing a substantially cylindrical shank and frustum-shaped head.

The head end of the stud is preferably enclosed by a cap member 15 comprising an end plate 16 closing the end of the hollow stud and a peripheral skirt or flange 17 adapted to be crimped over the ends of the head portion to secure the cap to the stud and hold the portions 12a—12a and 13a—13a of the stud in assembled relationship, preventing spreading thereof while in use. The end plate 16 of the cap may be formed with an elongated recess 18 to receive the end of a bladed tool, for example a screw driver, for rotating the stud in its supporting sheet 2.

The shank portion 11 of the stud is provided with radial arms adapted to engage the locking surface 5 of the socket member 4 upon partial rotation of the stud and in the preferred embodiment shown in Figs. 1 to 4 these radial arms may comprise integral hollow tubular pin-like bosses 20 extending radially outwardly from the opposed shank portions 12a—12a. These bosses 20 preferably have closed rounded ends 21 and are pressed or drawn from the metal forming the shank portions 12a—12a along the median line thereof during initial forming operations so that when the opposed shank portions 12a—12a are brought into co-mating relationship (as indicated by the dividing line Figs. 1, 4 and 5) the bosses will extend radially outwardly from the shank lying in a plane at right angles to the meeting edges of the co-mating shank sections. These bosses 20 may be formed any distance from the head to take care of a given thickness of installation to be fastened.

Figure 5:
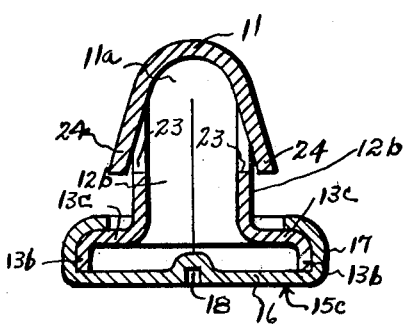
Fig. 5 is a vertical central sectional view of a modified form of stud.

In Fig. 5 I have shown another embodiment of the invention illustrating an alternative form of head for the stud as well as an alternate form and construction of radial arms. Instead of forming the head sections 13a—13a as outwardly flaring frustum-shaped sections as shown in Figs. 1 to 4, the head sections may be semi-cylindrical, as shown at 13b—13b (Fig. 5), and offset laterally from the shank portions 12b—12b by a shoulder portion 13c. The cap member 13c may be of substantially the same construction except that the skirt or flange 17 is sufficiently long to be crimped over a portion of the shoulder 13c, as shown in Fig. 5.

Figure 7:
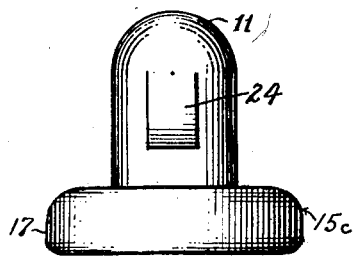

Instead of forming the radial arms 20 by pressing or drawing tubular pin-like bosses 20 from the opposed shank sections 12a—12a, as shown in Figs. 1 to 4, the shank portions 12b—12b may be slit as at 23 (Figs. 5 and 7) along spaced lines and the metal intermediate the slots bent outwardly to provide outwardly extending radially disposed extensions or fingers 24 adapted to engage the locking surface 5 of the socket member 4. Preferably these fingers are tangential to and merge with the surface of the semi-spherical nose 11 so as not to interfere with the entering of the stud in the socket aperture 6.

As will be apparent to those skilled in the art, the invention provides a strong durable rotary operative fastener stud which may be quickly and expeditiously manufactured from sheet metal at a minimum of cost.

Although I have illustrated and described preferred forms of my invention, I do not wish to be limited thereby because the scope of my invention is best defined by the following claims.

I claim:

1. In a rotary operative fastener, a rotary stud member adapted to be interlockingly engaged with a cooperating socket member, said stud comprising a hollow sheet metal body closed at one end and having integral radial tubular pin-like extensions intermediate the ends thereof, and a sheet metal cap secured to and closing one end of said hollow stud.

2. In a rotary operative fastener, a hollow sheet metal stud member adapted to be interlockingly engaged with a cooperating locking surface of a socket member, said stud having an elongated shank composed of co-mating semi-cylindrical sheet metal portions connected at certain ends by a continuous substantially semi-spherical portion defining a rounded entering nose for said stud, the ends of said shank portions opposite said nose extending outwardly therefrom and defining an enlarged stud head, and integral outwardly extending radial socket member engaging extensions on said shank intermediate the ends thereof for engagement with the locking surface of said socket member.

3. In a rotary operative fastener, a hollow sheet metal stud member adapted to be interlockingly engaged with a cooperating locking surface of a socket member, said stud having an elongated shank composed of co-mating semi-cylindrical sheet metal portions connected by a continuous substantially semi-spherical portion defining a rounded entering nose for said stud, the ends of said shank portions opposite said nose being flared outwardly presenting co-mating portions defining a head for said stud, means connecting said co-mating head portions together, and integral outwardly extending radial socket member engaging extensions on said shank intermediate the ends thereof for engagement with the locking surface of said socket member.

4. In a rotary operative fastener, a hollow sheet metal stud member adapted to be interlockingly engaged with a cooperating locking surface of a socket member, said stud having an elongated shank connected by a continuous substantially semi-spherical portion defining a rounded entering nose for said stud, the ends of said shank portions opposite said nose being flared outwardly presenting co-mating frustum-shaped portions defining a head for said stud, a sheet metal cap member engaging and enclosing the co-mating head portions of said stud for securing said co-mating portions in closed relationship, and integral outwardly extending radial socket member engaging extensions on said shank intermediate the ends thereof for engagement with the locking surface of said socket member.

5. In a rotary operative fastener, a hollow sheet metal stud member adapted to be interlockingly engaged with a cooperating locking surface of a socket member, said stud having an elongated shank connected by a continuous substantially semi-spherical portion defining a rounded entering nose for said stud, the ends of said shank portions opposite said nose being flared outwardly presenting co-mating frustum-shaped portions defining a head for said stud, a sheet metal cap member having a part providing a closure for the end of said hollow stud opposite said nose and a skirt portion encompassing portions of said co-mating head portions for holding said co-mating portions together, and integral radial extensions on said shank intermediate the ends thereof for engagement with the locking surface of said socket member.

WILMER H. CHURCHILL.

REFERENCES CITED

The following references are of record in the file of this patent:

UNITED STATES PATENTS

| Number | Name | Date |
| --- | --- | --- |
| 810,537 | Hopkins | Jan. 23, 1906 |
| 1,113,677 | Neider | Oct. 13, 1914 |
| 1,397,917 | Behrman | Nov. 22, 1921 |
| 1,859,779 | Lee | May 24, 1932 |
| 2,306,928 | Bedford, Jr. | Dec. 29, 1942 |
| 1,259,413 | Kirschbaum | Mar. 12, 1918 |